UNITED STATES PATENT OFFICE.

EMIL TEISLER, OF WURZEN, GERMANY, ASSIGNOR TO SHOLTO DOUGLAS, OF BERLIN, GERMANY.

PROCESS OF OBTAINING SILICIC AND HYDRO-FLUO-SILICIC ACIDS.

SPECIFICATION forming part of Letters Patent No. 626,511, dated June 6, 1899.

Application filed December 3, 1898. Serial No. 698,204. (No specimens.)

*To all whom it may concern:*

Be it known that I, EMIL TEISLER, doctor of chemistry, a subject of the King of Saxony, residing at Wurzen, in the Kingdom of Saxony, German Empire, have invented an improved process for obtaining purified silicic acid and hydro-fluo-silico acid from the lyes resulting from the purification of graphite by means of aqueous fluoric acid, of which the following is a specification.

The proposals made in some previous publications for the purification of graphite by means of chemicals could not up to now be practically realized, because the chemicals to be employed are too expensive and are turned into products of nearly no value at all, so that there is no compensation for the money expended in purifying the graphite by means of chemicals.

The purpose of my invention is to render one of those proposals suited for the practical application; and I attain this object in general by letting the process result, besides the purification of the graphite, in useful and valuable by-products, and in particular by distilling the mixture of soluble fluor compounds resulting from the action of aqueous fluoric acid upon impure graphite.

The invention proceeds thus from that proposal in which the purification of the graphite by fluor compounds is recommended. Such compounds are, first, gasiform fluoric acid; second, aqueous fluoric acid; third, fluor salts and compounds of such with mineral acids.

Ad 1. An economic purification of graphite by means of gasiform fluoric acid will hardly be practically executable, as the construction and manipulation of the apparatus are obviously connected with great difficulties. There is besides the other point that such process offers no means to free the graphite of a material part of its mineral impurities. The process is based upon the conversion of said mineral impurities or components into volatile fluor compounds, which latter shall then be removed. There is, however, only a part of the mineral components turned into volatile compounds—viz., that part of the silicic acid which has actually been turned into a fluoride—whereas the other part of the silicic acid and the fluorides of aluminium, of iron, of lime, and of the other impurities or components are volatile either only at high temperatures or not at all. The result of this process of purification is consequently very deficient and, concerning the price to be received for the graphite, by far too expensive.

Ad 2. The purification of the graphite by means of aqueous fluoric acid appears on first view as the simplest way. One side, the construction and manipulation of the apparatus, is not connected with unsurmountable difficulties, and on the other side the effect of the purification is far more favorable, because the fluor compounds arising are dissoluble partly in water, partly in fluoric acid, and partly in hydro-fluo-silico acid. Unfortunately the consumption of fluoric acid is too great and the value of the argilliferous, ferrous, calciferous, &c., silicofluoric acid is so very low that a practical execution of this process is out of the question unless that waste acid can be utilized in a satisfying manner.

Ad 3. The purification of graphite by means of fluor salts and compounds of such with mineral acids need not be discussed at all, because it is obviously by far too expensive.

My invention now resides in a process for turning into account the mixture of dissoluble fluor compounds resulting from the purification of the graphite by aqueous fluoric acid, and that process consists in distilling said mixture. The latter is by this means divided in a highly-volatile distillate containing fluosilicate or silicic acid and hydro-fluo-silico acid and a slightly-volatile or even nonvolatile residue containing the fluorides of aluminium, iron, calcium, and the like. In other words, I heat the solution containing the fluorine compounds, so as to cause that solution to evolve vapors. The latter are a mixture of steam and gasiform fluosilicate, and the fluosilicate is then caused to decompose in the presence of the water into silicic acid and hydro-fluo-silicic acid by being cooled. The volatile distillate—*i. e.*, the fluosilicate—is of course collected in and cooled by suitable means, such as are known and used by every expert for such purposes. I have from this reason abstained from representing such ones. I think it, however, useful to state what follows. The components of the impure hydro-fluo-silicic acid and the proportions of the components vary in certain limits. In a solution having a specific weight of one they are about as follows: water, ($H_2O$,) 75 per cent.; hydro-fluo-silicic acid, ($H_2SiFl_6$,) 20.55 per cent.; alumina, ($Al_2O_3$,) 2.25 per cent.; ferrous oxide, (FeO,) 1.01 per cent.; silicic acid, ($SiO_4H_4$,) 0.86 per cent. The vapors cooled by the heated solution consist of $3\ SiFl_4 + 4H_2O$. The $3SiFl_4$ then decomposes in the presence of the $H_2O$ into $SiO_4H_4 + 2SiH_2Fl_6$, the whole formula being thus:

$$3\ SiFl_4H_2O = SiO_4H_4 + 2SiH_2Fl_6.$$

The silicic acid and the hydro-fluo-silico acid are obtained nearly chemically pure and may at once be turned into account in any of the known manners. The residue, that consists of a mixture of fluorides, may be used for the manufacture of either fluoric acid (there being sulfate of alumina obtained at the same time) or fluoride of alumina or kryolithe. The aforedescribed process allows thus of converting nearly the whole contents of fluorin into a useful form. The costs of the fluoric acid necessary are reduced to minimum in consequence of the regaining of the contents of fluorin, and the possibility of purifying graphite by means of fluoric acid in a technically-executable manner is not any more out of question.

Having now described my invention, what I desire to secure by Letters Patent of the United States is—

The process for obtaining silicic acid and hydro-fluo-silicic acid from the aqueous solution of fluorin compounds resulting from the action of aqueous fluoric acid upon impure graphite, consisting in heating the solution, so as to cause it to evolve a mixture of steam and gasiform fluosilicate, cooling the mixture so as to cause the fluosilicate to decompose into silicic acid and hydro-fluo-silicic acid, and separating these two compounds from each other, substantially as described.

In witness whereof I have hereunto set my hand in presence of two witnesses.

EMIL TEISLER.

Witnesses:
 CRUP J. RICKELSURJA,
 ED. SCHATZ.